UNITED STATES PATENT OFFICE.

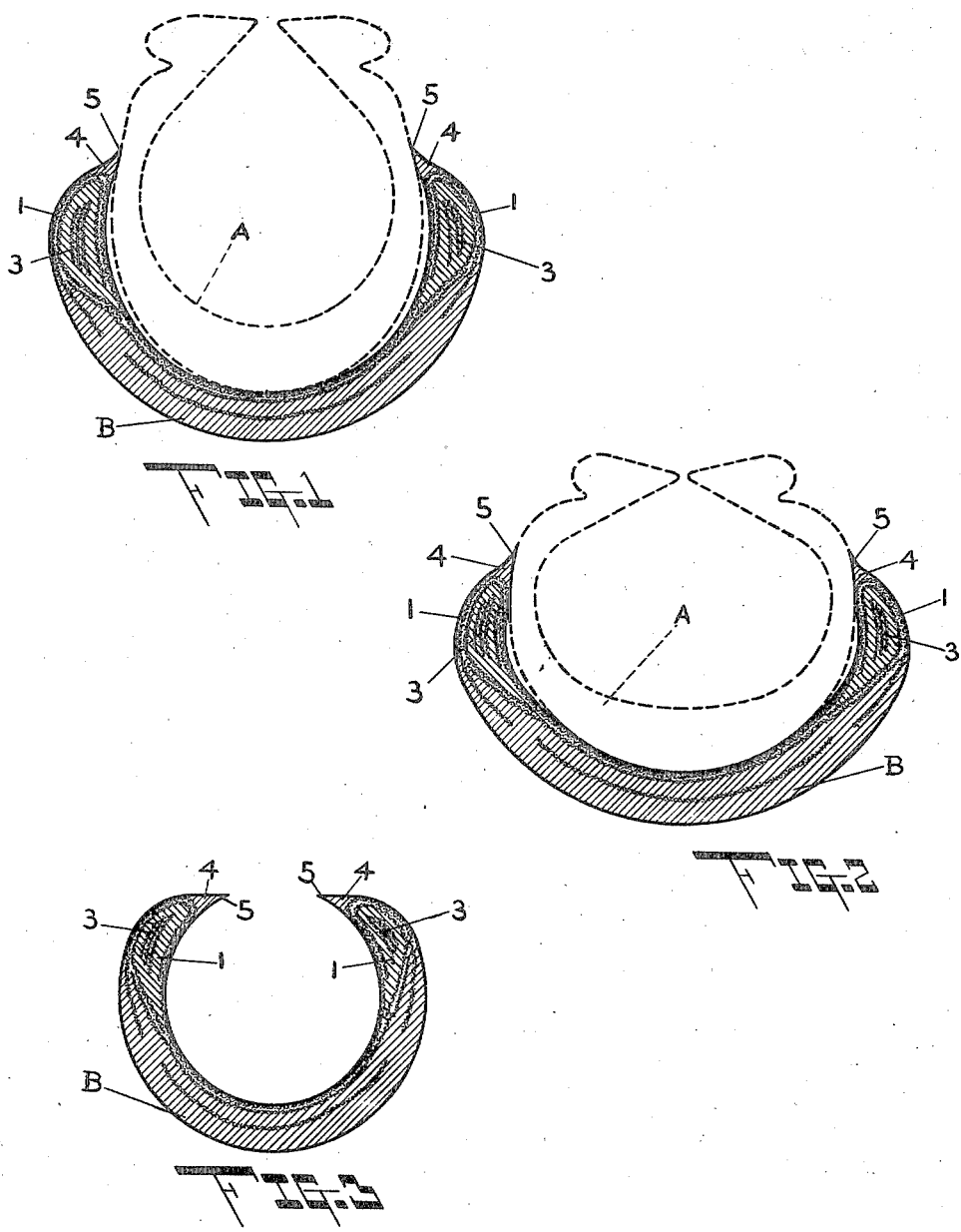

WILLIAM T. DORGAN, OF SAGINAW, MICHIGAN, ASSIGNOR TO WILLIAM J. WICKES AND ARTHUR D. EDDY, OF SAGINAW, MICHIGAN.

TIRE-PROTECTOR.

965,695. Specification of Letters Patent. Patented July 26, 1910.

Application filed December 20, 1907. Serial No. 407,364.

*To all whom it may concern:*

Be it known that I, WILLIAM T. DORGAN, a citizen of the United States, residing at Saginaw, in the county of Saginaw and State of Michigan, have invented certain new and useful Improvements in Tire-Protectors; and I do hereby declare the following to be a full, clear, and exact description of the invention, such as will enable others skilled in the art to which it appertains to make and use the same.

This invention relates to tire protectors and more particularly to protective coverings for pneumatic tires, such as are used on motor or other vehicles.

The object of this invention is to provide the edges of a tire protector with flexible lips adapted to hug the periphery of the tire and thereby prevent the admission of dust, dirt, liquid, mud, or other extraneous material between the inner surface of the protector and the outer surface of the tire.

This improvement is adapted for use with any form of tire protector similar to that set forth in my Patent, No. 871,575, for tire protector, issued November 19, 1907. For purposes of description, the improvement will be assumed to be applied to such a protector.

In the drawings, Figure 1 is a cross-sectional view of a deflated tire the outline of which is shown in dotted lines with the protector shown in full lines in place; Fig. 2 is a similar view showing the tire in dotted lines inflated and under pressure, as when supporting a vehicle; and Fig. 3 is a view showing the protector removed from the tire.

A indicates a tire of any desirable form and B is the protector, comprising, in the case selected for illustration, a sheath of rubber or other suitable material adapted to be slipped over the tire when the latter is deflated. At the margins of the sheath are located heavy elongated beads (1). The beads (1) are vulcanized to the sheath (B) and are practically integral therewith. The beads are composed preferably of a harder, tougher and less flexible material than is the sheath, and are preferably reinforced by means of suitable cores (3), vulcanized into the beads and composed of any suitable tough, fibrous, elastic or textile material, as canvas.

To prevent lodgment of extraneous material between the margin of the bead and the side of the tire, I provide each bead (1) with a flexible tapering lip (4) of resilient material, such as rubber. The lip in effect forms a continuation of the bead, the thin edge (5) of the lip being adapted to yieldingly and releasably hug the side of the tire. The beads preferably engage the tire at points on or above the horizontal cross diameter of the tire as the flexure of the tire at that point is less than near the tread surface. The inner face of the lip conforms to the general curvature of the inner periphery of the protector, the outer face of the lip conforming to the curvature of the outer surface of the protector. The thin edges (5) of the lips are so shaped as to practically merge with and form a continuation of the tire surface, as is clearly shown in the drawings. Thus the lips by their configuration and the close contact of their edges with the tire surface effectively shed the dust, dirt and liquid that may come in contact with them. It is obvious that these lips may also be applied to tire protectors other than the one illustrated.

Having thus fully disclosed my invention, what I claim as new is—

1. The combination with a tire, of a tire protector carried exteriorly of the tire and held firmly in place solely by the inflation of the tire, and flexible lips secured to the margins of the protector and adapted to hug the outer face of the tire.

2. The combination with a tire protector comprising a sheath, and beads carried by the edges of the sheath, the beads being concavo-convex in cross-section and relatively hard; of continuous lips forming projections of the beads, the lips being resilient and relatively soft and adapted to yieldingly engage and fit against the exterior sides of a tire above its horizontal diameter.

3. The combination with a tire protector substantially semi-circular in cross-section, of continuous tapering lips extending along the edges of the protector, the inner and outer faces of the lips normally conforming substantially to the curvature of the inner and outer surfaces of the protector, the free ends of the lips being adapted to releasably merge with and form a continuation of the outer surface of the tire above its horizontal diameter.

4. The combination with a tire, of a removable tire protector located exteriorly thereof, the longitudinal edges of the protector enveloping the tread surface of the tire and terminating above the horizontal diameter of the tire, and resilient flexible lips secured to the edges of the protector and constituting extensions thereof, the lips tapering to thin edges adapted to lie against the outer surface of the tire during its lateral movement, the outer surfaces of the lips merging into the periphery of the tire to prevent the entrance of extraneous material between the tire and its protector.

In testimony whereof, I affix my signature in presence of two witnesses.

WILLIAM T. DORGAN.

Witnesses:
N. M. ANGUS,
RALPH S. WARFIELD.